(12) United States Patent
Galford et al.

(10) Patent No.: US 7,772,545 B2
(45) Date of Patent: Aug. 10, 2010

(54) NUCLEAR LOGGING TOOL

(75) Inventors: James E. Galford, Missouri City, TX (US); Andrew A. Hrametz, Rosenberg, TX (US); Jerome A. Truax, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 39 days.

(21) Appl. No.: 12/178,907

(22) Filed: Jul. 24, 2008

(65) Prior Publication Data

US 2010/0019138 A1    Jan. 28, 2010

(51) Int. Cl.
    *G01V 5/10*    (2006.01)
(52) U.S. Cl. .................................. 250/269.6
(58) Field of Classification Search ............. 250/269.6, 250/269.2, 269.7, 266, 268, 265, 257, 269.4, 250/269.8
See application file for complete search history.

(56) References Cited

U.S. PATENT DOCUMENTS

| | | | |
|---|---|---|---|
| 3,219,820 A | 11/1965 | Hall, Jr. | |
| 3,510,654 A | 5/1970 | Paap et al. | |
| 3,932,747 A | 1/1976 | Sherman | |
| 4,078,174 A | 3/1978 | Goldman | |
| 4,504,736 A | 3/1985 | Smith, Jr. | |
| 4,661,701 A | 4/1987 | Grau | |
| 4,780,266 A * | 10/1988 | Jordan et al. | 376/162 |
| 5,021,653 A | 6/1991 | Roscoe | |
| 5,521,378 A * | 5/1996 | Roscoe et al. | 250/269.6 |
| 5,817,267 A | 10/1998 | Covino | |
| 6,825,459 B2 | 11/2004 | Bothner | |
| 6,851,476 B2 | 2/2005 | Gray | |
| 7,148,471 B2 | 12/2006 | Roscoe | |
| 7,285,772 B2 | 10/2007 | Labous | |
| 7,342,222 B2 | 3/2008 | Griffiths | |

OTHER PUBLICATIONS

Schwietzer, J.S., et al. "Gamma Ray Spectroscopy Tool: Environmental Effects", Journal of Petroleum Technology (Sep. 1984) 1527-1534—US.
Hertzog, R., et al. "Geochemical Logging with Spectrometry Tools", SPE Formation Evaluation (Jun. 1989) 153-162—US.
Pemper, R., et al. "A New Pulsed Neutron Sonde for Derivation of Formation Lithology and Mineralogy", paper SPE 102770 presented at the Sep. 2006 SPE Annual Technical Conference and exhibition, San Antonio, TX 24-27.
Briesmeister, J.F., Editor, 2000 "MCNP—A General Monte Carlo N-Particle Transport Code, Version 4C", LA-13709-M, Los Alamos, New Mexico.
Wikipedia, Boron, Jun. 20, 2008.

* cited by examiner

*Primary Examiner*—David P Porta
*Assistant Examiner*—Faye Boosalis
(74) *Attorney, Agent, or Firm*—Mark E. Scott; Conley Rose, P.C.

(57) ABSTRACT

Nuclear logging tool. At least some of the illustrative embodiments are methods comprising placing a logging tool within a borehole proximate to an earth formation, releasing energetic neutrons from the logging tool, and receiving (at a detector within the logging tool) gamma returns indicative of interactions of the neutrons with elements of the logging tool and elements of the formation, and the gammas indicative of neutron interactions with elements of the logging tool are substantially free from gammas indicative of interactions with iron atoms.

25 Claims, 5 Drawing Sheets

NUCLEAR LOGGING TOOL

CROSS REFERENCE TO RELATED APPLICATIONS

None.

BACKGROUND

Pulsed-neutron nuclear logging tools operate by releasing high energy neutrons, on the order of 14 Million electron Volts (MeV), into the borehole and formation. The neutrons create gamma particles or gamma rays (hereafter just gammas) by one of several of interactions with the surrounding atoms: 1) the neutrons inelastically collide with atomic nuclei and thereby create gammas (known as inelastic gammas); and 2) when a neutron loses energy (possibly through the inelastic collisions or by other means) the neutron is captured by the nucleus of a nearby atom and in the process a gamma is emitted (known as a capture gamma). The atoms with which the neutrons collide and/or the neutrons are captured can be determined by the energy (or frequency) of the gammas produced.

When using a pulsed-neutron nuclear logging tool as a bulk density measurement device, inelastic gammas carry most of the information as to the formation bulk density. When using a pulsed-neutron nuclear logging tool to determine formation lithology or the macroscopic capture cross-section, it is often the capture gammas that carry most of the information. However, elements of the various components that are in, or which form, the borehole (e.g., drilling fluid, casing, cement, production tubing, or the logging tool itself) also interact with neutrons, and thus it is difficult in the related art to distinguish gammas originating within the borehole from those originating within the formation.

BRIEF DESCRIPTION OF THE DRAWINGS

For a detailed description of exemplary embodiments, reference will now be made to the accompanying drawings in which.

NOTATION AND NOMENCLATURE

Certain terms are used throughout the following description and claims to refer to particular system components. As one skilled in the art will appreciate, different companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection, or through an indirect connection via other devices and connections.

"Gamma" or "gammas" shall mean energy created and/or released due to neutron interaction with atoms, and in particular atomic nuclei, and shall include such energy whether such energy is considered a particle (i.e., gamma particle) or a wave (i.e., gamma ray or wave).

"Enriched boron" shall mean boron where the boron 10 isotope present is greater than 21% by weight of the total boron present.

"Energetic neutrons" shall mean free neutrons having energy above thermal energy of about 0.025 electron Volts (eV), and energetic neutrons include epithermal neutrons (having energy of about 0.024 to 1 eV) and fast neutrons (having energy of about 1.0 Mega eV (MeV)).

"Substantially free" in relation to received gammas and a listed element shall mean that received gammas comprise not more than 1.5 times the number of gammas characteristic of the listed element that would be received at a logging tool using MP35N for the pressure vessel. This definition shall not require use of MP35N, as the results may be achieved with metallic components having greater percentages of the listed elements than MP35N, but with neutron absorptive coatings.

"Lithology" relates to mineralogy as inferred from elemental constituency.

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

The various embodiments are directed to systems and related methods of nuclear logging tools for determining parameters of formations surrounding a borehole. In some cases, the embodiments perform neutron-induced gamma spectroscopy for performing geochemical evaluations of formations. However, the various embodiments are also useful in other neutron-induced logging, such as neutron decay and carbon-oxygen logging.

Figure 1:
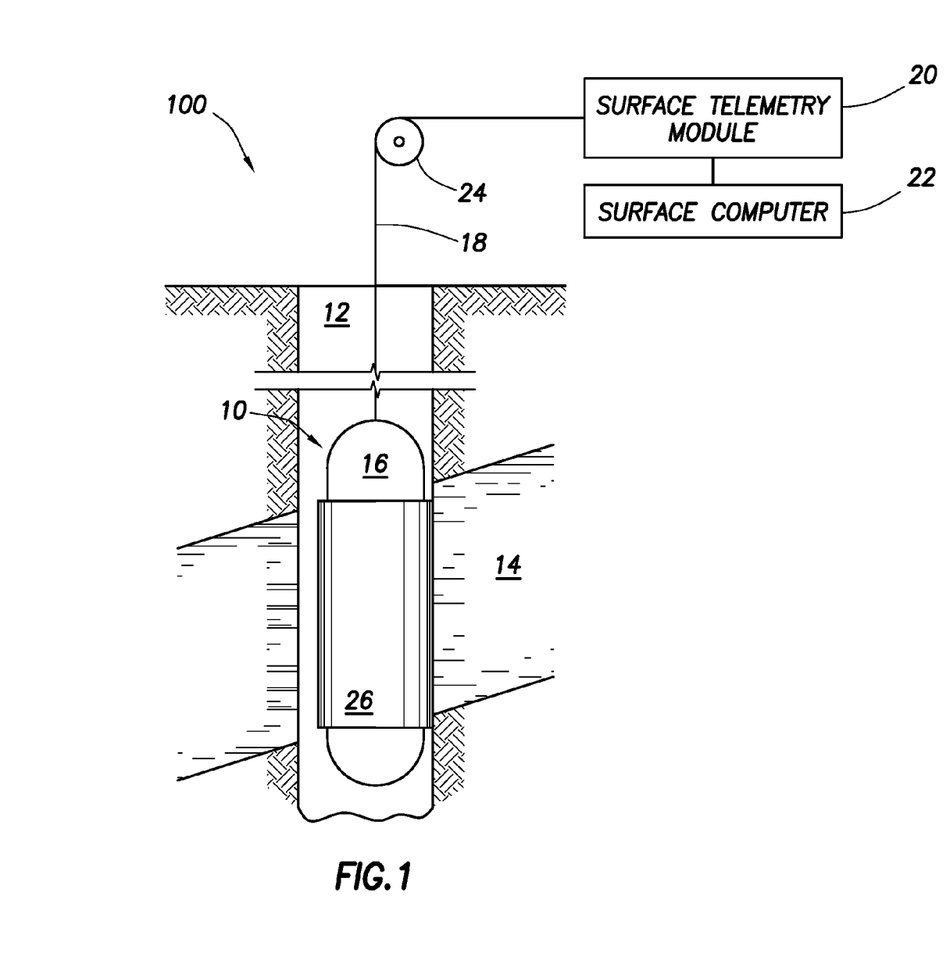
FIG. 1 shows system in accordance with at least some embodiments.

FIG. 1 illustrates a nuclear logging system 100 constructed in accordance with at least some embodiments. In particular, a nuclear logging tool 10 is placed within a borehole 12 proximate to a formation 14 of interest. The tool 10 comprises a pressure vessel 16 within which various subsystems of the tool 10 reside, and the pressure vessel 16 is suspended within the borehole 12 by a cable 18. Cable 18, in some embodiments a multi-conductor armored cable, not only provides support for the pressure vessel 16, but also communicatively couples the tool 10 to a surface telemetry module 20 and surface computer 22. The tool 10 may be raised and lowered within the borehole 12 by way of the cable 18, and the depth of the tool 10 within the borehole 12 may be determined by a depth measurement system 24 (illustrated as a depth wheel). As will be discussed more thoroughly below, in some embodiments the pressure vessel 16 is at least partially covered with a thermal neutron adsorptive coating 26 (the thickness of which is exaggerated for clarity of the figure).

Figure 2:
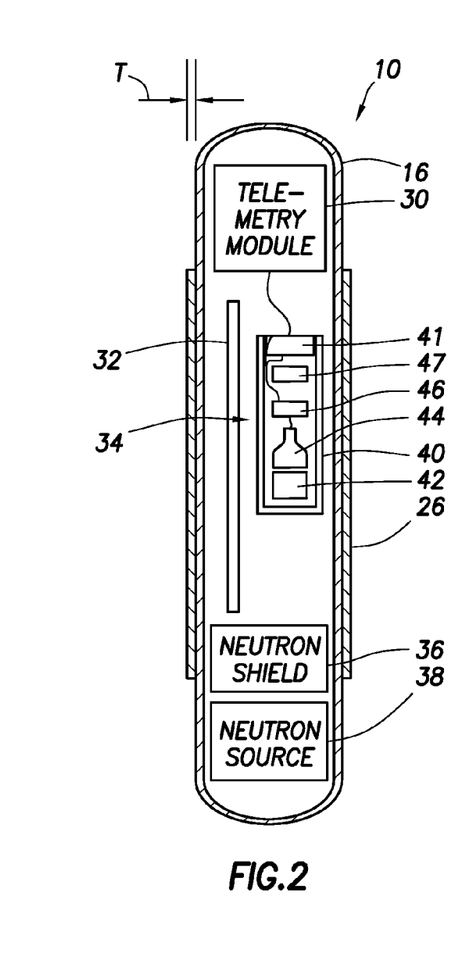
FIG. 2 shows a simplified cross-sectional view of the nuclear logging tool in accordance with at least some embodiments.

FIG. 2 shows a simplified cross-sectional view of the nuclear logging tool 10 to illustrate the internal components in accordance with the various embodiments. In particular, FIG. 2 illustrates the pressure vessel 16 houses various components, such as the telemetry module 30, borehole shield 32, gamma detector 34, neutron shield 36 and neutron source 38. The neutron source 38 can be a Americium/Beryllium neutron source, a Californium-252 neutron source, a deuterium/tritium neutron generator, or a deuterium/deuterium neutron generator. However, any neutron source capable of producing and/or releasing neutrons with sufficient energy may be equivalently used.

The nuclear logging tool 10 further comprises a gamma detector 34. While the gamma detector 34 is shown above the neutron source 38, in other embodiments the gamma detector 34 is below the neutron source 38. In some embodiments, the gamma detector is 14.5 inches from the neutron source 38, but other distances may be equivalently used. The gamma detector 34 detects arrival of, and energy of, gammas created by interactions of neutrons with atoms both in the formation 14, as well as atoms that make up the various components of the logging tool 10. In at least some embodiments, the gamma detector 34 comprises a metallic Dewar flask 40 sealed by a stopper 41, and within the Dewar flask 40 resides a crystal 42 (e.g., a 3 inch by 4 inch bismuth germinate scintillation crystal), a photomultiplier tube 44 in operational relationship to the crystal 42, a processor 46 coupled to the photomultiplier tube 44, and eutectic material 47. As gammas are incident upon/within the crystal 42, the gammas interact with the crystal 42 and flashes of light are emitted. Each flash of light itself is indicative of an arrival of a gamma, and the intensity of the light is indicative of the energy of the gamma. The output of the photomultiplier tube 44 is proportional to the intensity of the light associated with each gamma arrival, and the processor 46 quantifies the output as gamma energy and relays the information to the surface computer 22 by way of the telemetry module 30.

In operation, the logging tool 10 is placed within a borehole 12 proximate to a formation of interest. The neutron source 38 releases energetic neutrons. In order to reduce the irradiation of the gamma detector 34 by energetic neutrons from the neutron source 38, the neutron shield 36 separates the neutron source 38 from the gamma detector 34, and the neutron shield 36 may be constructed of a high density material (e.g., a tungsten-based material, such as HEVIMET® available from General Electric Company of Fairfield, Conn. The energetic neutrons are focused to some extent toward the side of the tool 10 that contacts with the borehole wall, but because of the speed of energetic neutrons (e.g., 14,000 kilometers/second or more), and because of collisions of the neutrons with atomic nuclei that change the direction of movement of the neutrons, the neutrons may produce a neutron flux around the logging tool 10 that extends into the formation 14.

The neutrons interact with atoms by way of inelastic collisions and/or thermal capture. In the case of inelastic collisions, a neutron inelastically collides with an atomic nuclei, and in the process a gamma is created (an inelastic gamma) and the energy of the neutron is reduced. The neutron may have many inelastic collisions with atomic nuclei, each time creating an inelastic gamma and losing energy. At least some of the gammas created by the inelastic collisions are incident upon the gamma detector 34. One or both of the time of arrival of a particular gamma, and its intensity, may be used to determine the type of atom with which the neutron collided, and thus parameters of the formation 14. For example, gammas associated with inelastic collisions may be used to determine formation properties such as bulk density and carbon-oxygen ratio.

After one or more inelastic collisions (and corresponding loss of energy), a neutron reaches an energy known as thermal energy (i.e., a thermal neutron). At thermal energy, a neutron can be captured by atomic nuclei. In a capture event, however, the capturing atomic nucleus enters an excited stated, and the nucleus later transitions to a lower energy state by release of energy in the form a gamma (known as a thermal gamma). At least some of the thermal gammas created by thermal capture are also incident upon the gamma detector 34. One or both of the time of arrival of a particular gamma, and its intensity, may be used to determine the type of atom into which the neutron was captured, and thus parameters of the formation 14. In particular, the energy of capture gammas (as inferred from the intensity of the light in the detector) may be used to determine the formation lithology.

However, production of inelastic gammas and capture gammas is not limited to atoms residing within the formation. Atoms of the borehole fluid, and atoms that makeup the elements of the tool 10 also produce inelastic gammas and capture gammas, and which gammas may be incident upon the gamma detector 34. Still referring to FIG. 2, in order to reduce the number of gammas created by interaction of neutrons with the borehole fluid reaching the gamma detector 34 from the borehole side, the tool 10 comprises a shield 32 of a high density material (e.g., HEVIMET®). While the shield 32 may by useful in reducing gamma entry from the borehole side of the tool 10, the shield does nothing to stop gamma creation within the tool 10. For example, and with respect to capture gammas, while the type of atom that produced a capture gamma may be determined from the energy of the gamma, for elements that reside both within the formation and the tool 10 (e.g., iron), distinguishing whether an atom that produced a capture gamma is within the formation or part of the tool 10 is not possible. The portion of the received gammas corresponding to gammas created by interactions with elements of tool 10 is referred to herein as the tool signal. Stated otherwise, the total return gammas may be logically considered to comprise a formation signal (gammas that originate within the formation 14) and a tool signal (gammas that originate in the tool 10).

In the related art, the large metallic components of a nuclear logging tool, such as the pressure vessel, are selected to provide the strength and/or corrosion resistance deemed necessary by the tool designer. For example, the pressure vessel is selected to be of sufficient strength to withstand the pressures, temperatures and fluids encountered downhole, which may be on the order of several thousand pounds per square inch (PSI), 200° C. or more, and comprise corrosive environments. However, the selection of metallic materials for use in the nuclear logging tools of the related art is without regard to the components of the metallic materials in relation to the formations to be tested. While many elements may be of interest to a geologist in evaluating formation lithology, many such elements may likewise be present in the related art metallic materials. For example, a geologist may be interested in the amount of iron, manganese, aluminum and titanium (among others) present in the formation. The material of choice for the pressure vessel and other components (e.g., source deployment, insulating flask 40, eutectic 47) in the related art is typically a stainless steel, such as 17-4 stainless steel, which comprises approximately 73% iron, 17% chromium and 4% nickel, all by weight. Thus, in this illustrative case, a significant amount of iron is present in the tool, and iron within the formation is also of interest. Because of the amount of iron in the tool, the tool signals of related art nuclear logging tend to mask the components of the formation.

In order to reduce the undesirable tool signals that cover or mask determinations of formation lithology, a nuclear logging tool 10 in accordance with at least some embodiments implements one or both of enhanced shielding to reduce the number of thermal neutrons entering the tool, and use of particular materials for at least some of the large metallic components of the tool. Material selection is discussed first, followed by the enhanced shielding.

In accordance with at least some embodiments, material selection for the large metallic components (e.g., pressure vessel, insulating flasks, eutectics) is based on reducing constituent components of the selected materials that are also of interest in the formations. In particular, in accordance with the various embodiments at least some metallic materials are selected and/or used in the logging tool where the amount of iron, manganese, aluminum and titanium is reduced or eliminated. Consider, as an example, an alloy known as MP35N® available from SPS Technologies, Inc. of Jenkintown, Pa. The MP35N alloy comprises approximately 20% by weight chromium, approximately 35% by weight nickel, approximately 10% by weight molybdenum, and approximately 35% by weight cobalt. The illustrative MP35N alloy typically contains less than 1% iron, less than 0.15% manganese, less than 1% titanium, and no aluminum, and thus is substantially free of the elements important to geochemical evaluations of formations. Moreover, the illustrative MP35N has sufficient strength to be used as pressure housings in expected downhole conditions.

In order to confirm the benefits of selecting metallic materials for the logging tool 10 as discussed above, Monte Carlo simulations were run for several different types of formation, different porosity values for each formation type, and different tool materials. In particular, the simulations modeled an eight inch fresh-water filled borehole, with surrounding formations of quartz sandstone, calcite, dolomite and mixed quartz sandstone-pyrite mineralogy. With the exception of mixed quartz sandstone-pyrite mineralogy, the simulated formations contained no iron, manganese, titanium or aluminum. Thus, received gammas from these elements in the simulations were directly a consequence of interactions with elements of the tool. The sandstone and calcite formations were simulated at 0 and 20 porosity units (p.u.), and the dolomite formation was modeled at 0 and 25 p.u. The simulations were carried out for the illustrative MP35N, as well as: INCONEL® 718 (iron content of approximately 17%); INCONEL® 925 (iron content of approximately 25%); and 17-4 stainless steel (iron content of approximately 73%).

Figure 3:
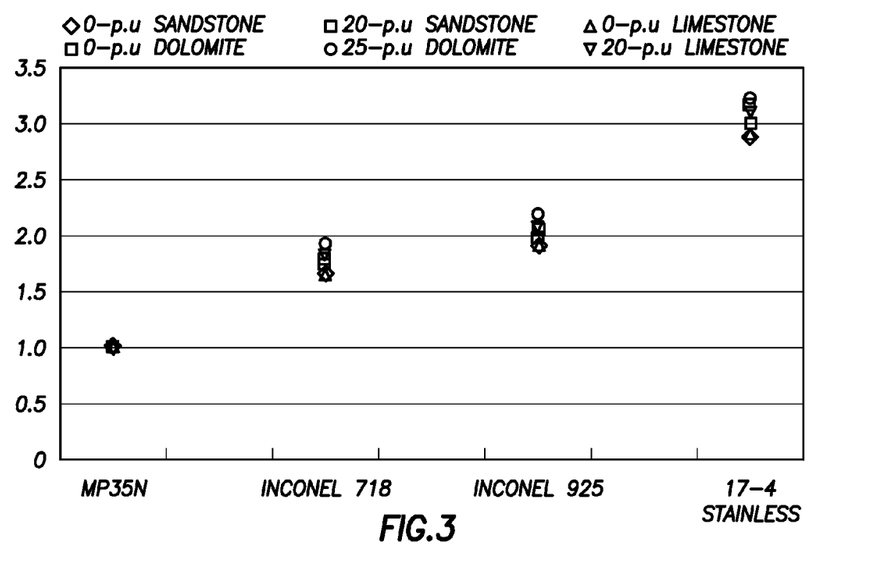
FIG. 3 shows a graph of iron tool signal response.

FIG. 3 shows a graph of the results of the analysis in relation to the iron portion of the received gammas. Although MP35N has no, or only trace amounts, of iron, the graphical results are normalized in relation to the iron portion of the received gammas for MP35N (i.e., the iron portion of the tool signal for MP35N is normalized to a value of one). FIG. 3 shows that the iron portion for MP35N is smaller by just under half compared to INCONEL 718, and right at half compared to INCONEL 925. Moreover, the iron portion for MP35N is one-third the strength of the received gammas for 17-4 stainless steel.

Figure 4:
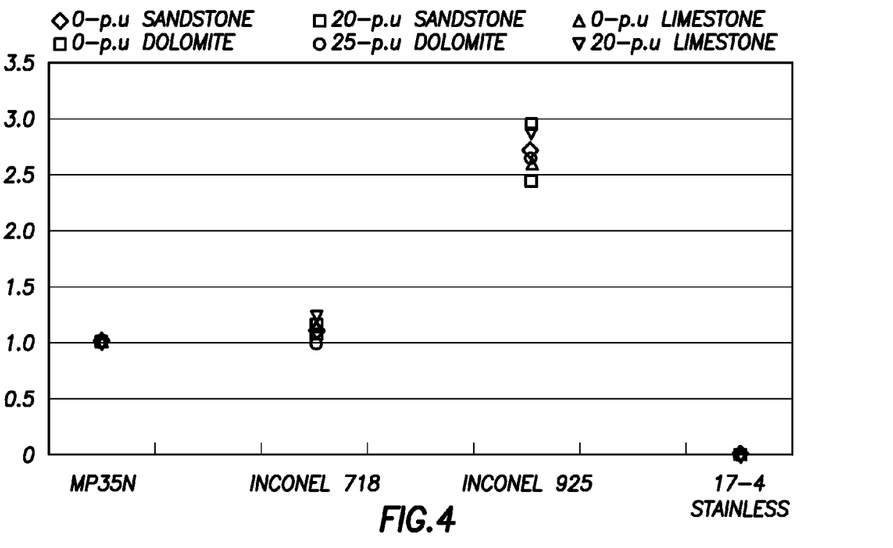
FIG. 4 shows a graph of titanium tool signal response.

FIG. 4 shows a graph of the results of the analysis in relation to the titanium portion of the received gammas. Although MP35N has no, or only trace amounts, of titanium, the graphical results are normalized in relation to the titanium portion of the received gammas for MP35N. FIG. 4 shows that the titanium portion for MP35N is approximately the same as INCONEL 718, and is about one-third the strength of the received gammas for INCONEL 925. Stainless of the 17-4 variety apparently has virtually no titanium, and thus the result with respect to MP35N is higher than for 17-4 stainless.

Figure 5:
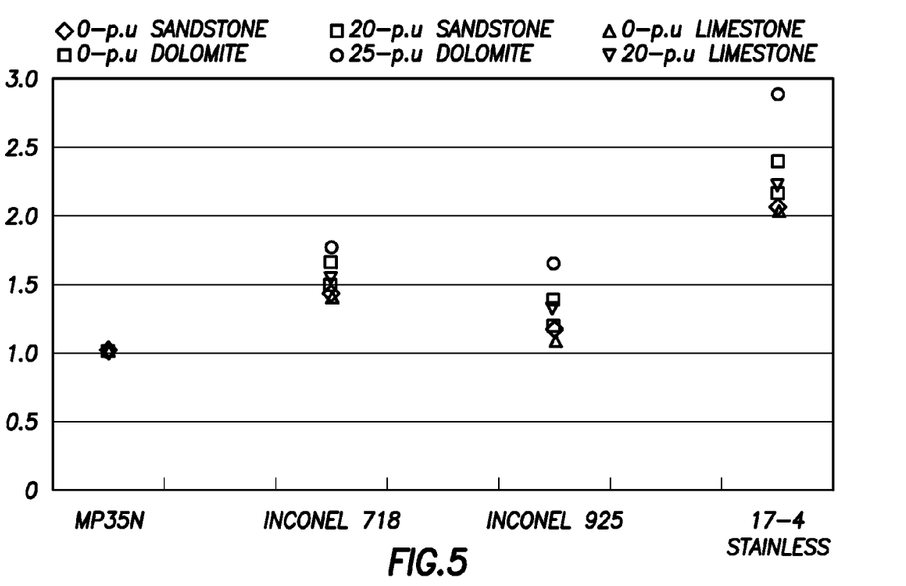
FIG. 5 shows a graph of manganese tool signal response.

FIG. 5 shows a graph of the results of the analysis in relation to the manganese portion of the received gammas. Although MP35N has no, or only trace amounts, of manganese, the graphical results are normalized in relation to the manganese portion of the received gammas for MP35N. FIG. 5 shows that the manganese portion for MP35N is slightly less than both INCONEL 718 and INCONEL 925. Moreover, the manganese portion for MP35N is one-half to one-third the strength as for 17-4 stainless steel, depending on the modeled formation and porosity.

Figure 6:
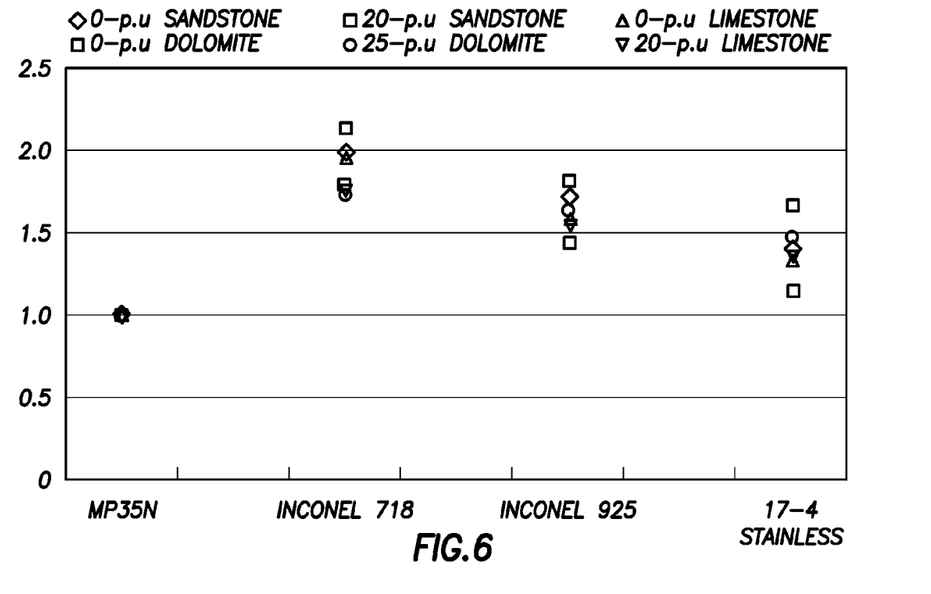
FIG. 6 shows a graph of aluminum tool signal response.

FIG. 6 shows a graph of the results of the analysis in relation to the aluminum portion of the received gammas. Although MP35N has no, or only trace amounts, of aluminum, the graphical results are normalized in relation to the aluminum portion of the received gammas for MP35N. In particular, FIG. 6 shows that the aluminum portion for MP35N is smaller than INCONEL 718, INCONEL 925 and 17-4 stainless steel, though the 17-4 stainless steel aluminum response approaches that of MP35N depending on the modeled formation and porosity.

Taking FIGS. 3-6 together, it is seen that the illustrative MP35N offers significantly reduced tool signal regarding elements important to geochemical evaluations of formations, such as iron, manganese, aluminum and titanium. MP35N is merely illustrative of metallic materials that may be selected. In accordance with the various embodiments, any metallic material, that also meets strength and corrosion resistance needs, may be used so long as the material selected has an iron content 17% or less by weight, and one or all of a manganese content of 0.4% or less by weight, an aluminum content of 0.8% or less by weight, and a titanium content of 1.2% or less by weight. The metallic material selected may be used for at least some, if not all, the large metallic structures of the logging tool, such as the pressure vessel, insulating flasks, eutectics.

Figure 7:
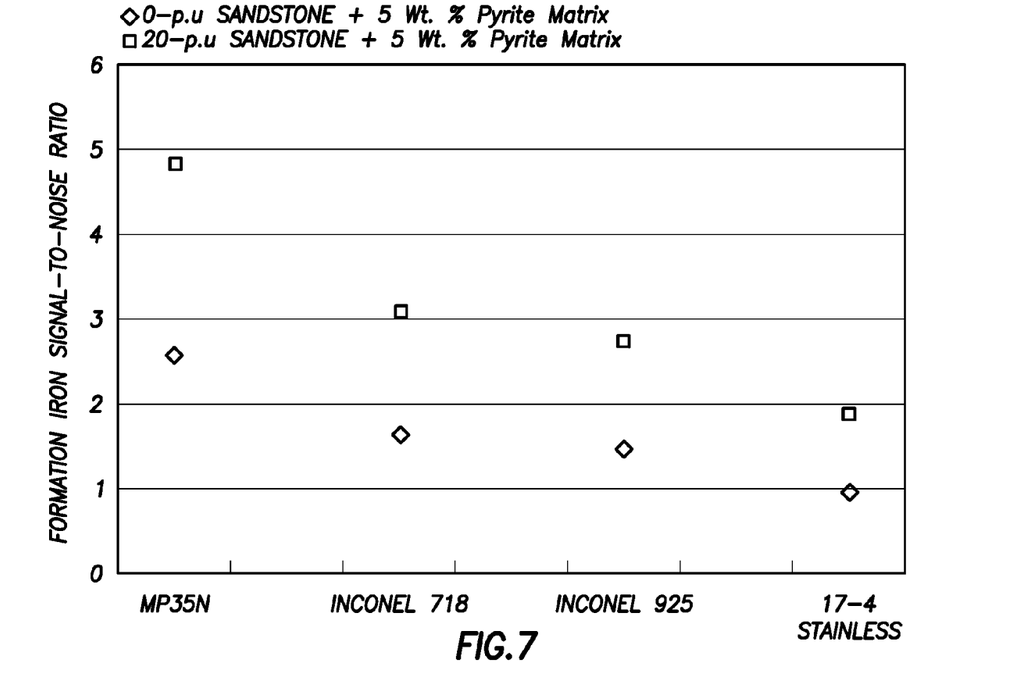
FIG. 7 shows a graph of signal to noise ratio.

FIG. 7 shows a graph of the results of the analysis from the standpoint of signal to noise ratio. In particular, the Y axis shows formation iron signal to noise ratio, and the X axis shows different metals. Each metal is plotted with respect to two formations, a 0 p.u. sandstone with 5% by weight pyrite matrix, and a 20 p.u. sandstone with 5% by weight pyrite matrix. For each plotted point the tool signal portion of the gamma return is viewed as noise (the tool signal and formation signal being separable in simulation) and the formation signal viewed as signal. Thus, the illustrative MP35N shows a signal to noise ratio of about 4.75 for the 20 p.u. formation, and a 2.5 signal to noise ratio for the 0 p.u. formation. Regardless of the simulated formation porosity, the formation iron signal to noise ratio obtained with MP35N is superior to the formation iron signal to noise ratios obtained with Inconel 718, Inconel 925 and 17-4 stainless steel.

Figure 8:
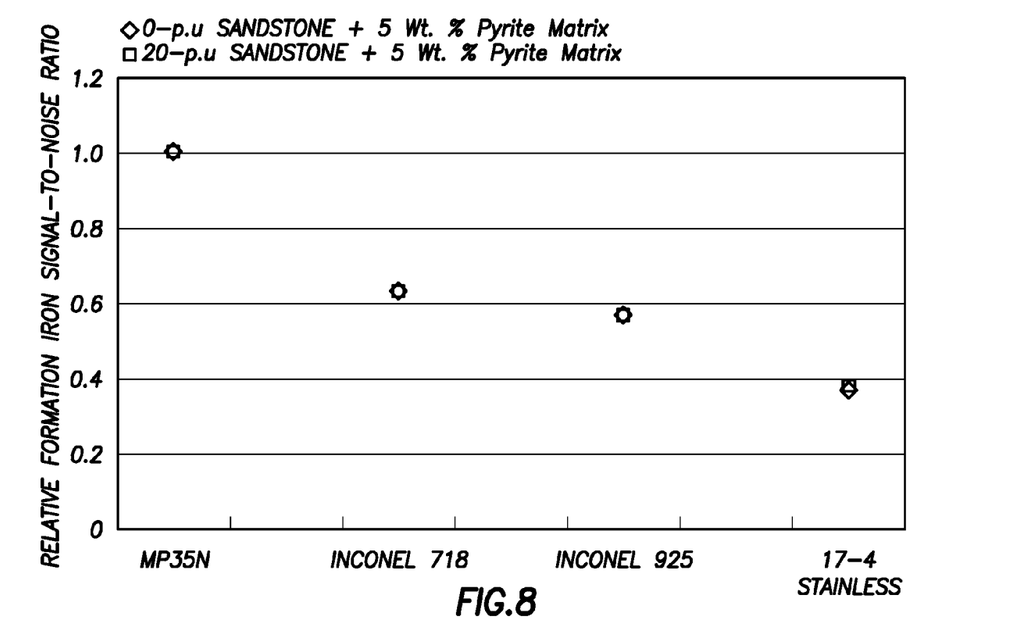
FIG. 8 shows a graph of signal to noise ratio relative to MP35N.

FIG. 8 shows a graph of the results of the analysis relative to MP35N. In particular, like FIG. 7 the Y axis shows formation iron signal to noise ratio, and the X axis shows different metals. The signal to noise ratio normalized to MP35N is plotted for each metal with respect to two formations, a 0 p.u. sandstone with 5% by weight pyrite matrix, and a 20 p.u. sandstone with 5% by weight pyrite matrix. And here again, the tool signal portion of the gamma return is viewed as noise (the tool signal and formation signal separable in simulation) and the formation signal viewed as signal. Thus, normalized to itself, the MP35N shows a relative signal to noise of one, while the relative signal to noise of the other metals falls off sharply, with 17-4 stainless having a relative signal to noise of 0.38. As demonstrated in FIG. 8, the simulated formation iron signal to noise ratio obtained with MP35N is 1.58 times better than Inconel 718, 1.77 times better than Inconel 925, and 2.6 times better than 17-4 stainless steel.

Before proceeding, it is noted that all components that make up a nuclear logging tool produce gammas in inelastic collisions with energetic neutrons, and likewise produce gammas based on thermal neutron capture. The selection and use of any particular material for the tool 10 components does not stop such gamma creation; however, with carefully chosen tool 10 components, the gammas created by interaction of neutrons with the tool 10 components may be easily algorithmically separated from the overall gamma returns because the characteristics of the gammas (e.g., energy) identify the elements with which the neutrons interacted. When carefully chosen, such elements are either unimportant to geochemical evaluations of formations, or are present in the logging tool 10 in small enough quantities that the formation signal is not unduly masked.

The selection and use of particular metallic materials as described to this point may be implemented alone to achieve better nuclear logging tool performance compared to related art nuclear logging tools. In addition to, or in place of, such material selection, the various embodiments also utilize an enhanced shielding system and method. As mentioned with respect to FIG. 1, a tool 10 in accordance with at least some embodiments uses a neutron absorptive coating 26. The purpose of the neutron absorptive coating 26 is to capture thermal neutrons before such neutrons enter the tool and thus create capture gammas, where such capture gammas created in the tool may be indistinguishable from capture gammas originating in the formation.

Unlike related-art nuclear logging tools which use a boron impregnated rubber sleeve telescoped over the pressure vessel as a thermal neutron shield, in accordance with at least some embodiments the neutron absorptive coating 26 is a boron-based component adhered to at least a portion of the outer surface of the pressure vessel 16. In particular, the boron-based component is thermally fused to the pressure vessel 16, such as by spray coating with the boron-based component in plasma form. In at least some embodiments the neutron absorptive coating 26 is boron carbide (with a nickel binder) adhered to at least a portion of outer surface of the pressure vessel 16. Alternatively, the neutron absorptive coating may consist of elemental boron in combination with a suitable binder, such as nickel.

Boron has two stable isotopes, boron 10 (having 5 neutrons in the nucleus) and boron 11 (having 6 neutrons in the nucleus). Naturally occurring boron is between approximately 19.1% and 20.3% boron 10, with the remaining being boron 11. Boron 10, however, is the isotope that is good at capturing thermal neutrons. Thus, in accordance with at least some embodiments, the neutron absorptive coating 26 uses enriched boron (that is, having a greater percentage of boron 10 than naturally occurring boron). More particularly, in accordance with at least some embodiments, the neutron absorptive coating 26 has 0.1 grams of boron-10 per square centimeter ($g/cm^2$) or more of boron 10. In at least some embodiments, the neutron absorptive coating 26 comprises between 0.3 to 0.38 $g/cm^2$ of enriched boron carbide.

Using enriched boron carbide for the neutron absorptive coating 26 not only provides enhanced thermal neutron shielding, but also decreases the shielding thickness (T in FIG. 2). For example, in the related art, naturally occurring boron impregnated rubber sleeves may be on the order of 0.25 inches or more in thickness, resulting in a 0.5 inches or more of increased diameter of the logging tool. In accordance with the various embodiments, and considering the enriched boron carbide alone, 0.3 to 0.38 $g/cm^2$ results in a thickness of about 0.063 inches. Considering the enriched boron carbide with a binder, the thickness of the neutron absorptive coating 26 may be as thin as 0.100 inches or less.

In order to confirm the benefits of using enhanced boron for the logging tool 10 neutron absorptive coating 26, Monte Carlo simulations were run for several different boron 10 enriched boron carbide concentrations of the neutron absorptive coating 26, and different formation porosities. In particular, the simulations modeled an eight inch fresh-water filled borehole, with surrounding formations of sandstone simulated at 0 and 20 p.u.

Figure 9:
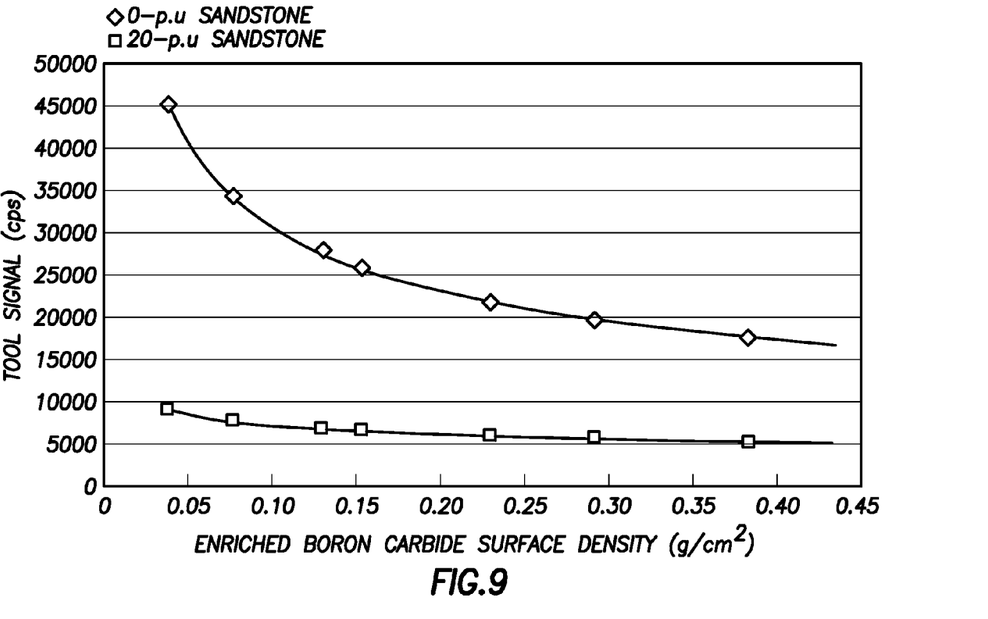
FIG. 9 shows a graph of tool signal response in relation to boron 10 concentration in a neutron absorptive coating.

FIG. 9 shows a graph of the results of the analysis. In particular, the graph shows along the Y axis the tool signal (gammas produced inside the tool) in counts per second, and along the X axis the modeled concentrations of enriched boron (in this illustrative case, boron carbide comprising enriched boron). Although the response with the respect to the 20 p.u. sandstone is relatively flat, with respect to the zero p.u. sandstone, as the concentration of boron 10 increases, the tool signal is reduced asymptotically. In the case of 0.3 $g/cm^2$ of enriched boron carbide and above, the count rate drops by more than half as compared to 0.05 $g/cm^2$ of enriched boron carbide. Here again, capture of thermal neutrons by the boron 10 of the thermal neutron shield results in capture gammas with energies of about 0.48 MeV, which energy is outside (below) the energy range of interest for formation gamma rays. Thus, boron gamma rays can be discriminated on that basis.

Figure 10:
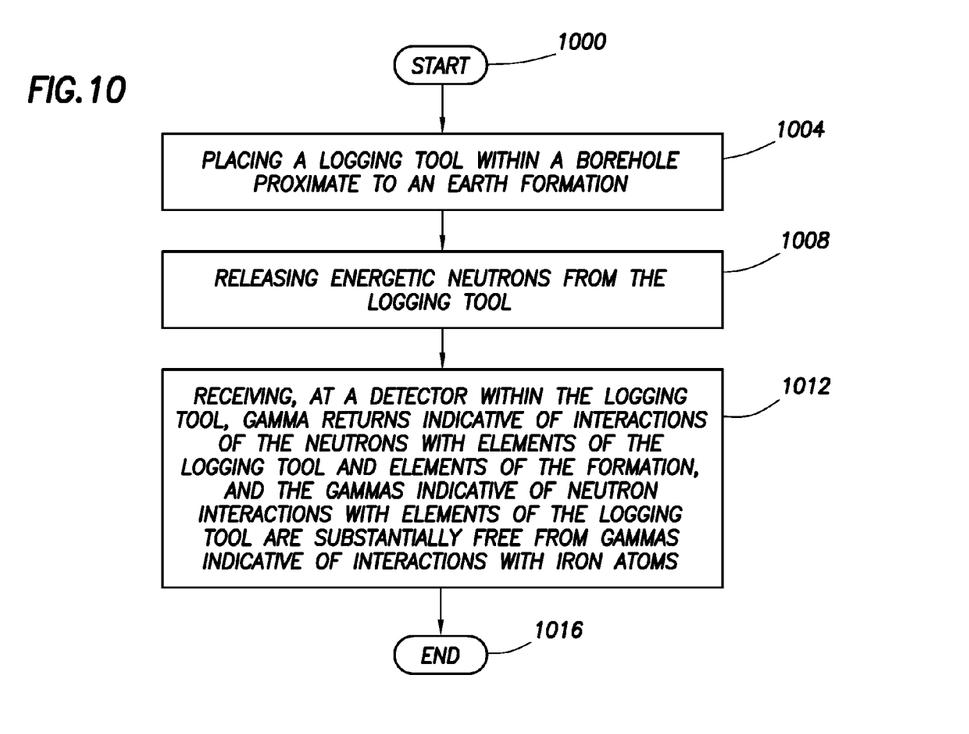
FIG. 10 shows a method in accordance with at least some embodiments.

FIG. 10 shows a method in accordance with at least some embodiments. In particular, the method starts (block 1000), and proceeds to placing a logging tool within a borehole proximate to an earth formation (block 1004). The placing may take many forms. In some embodiments, the logging tool is a wireline tool, and thus placing may involve lowering the tool on a cable within the borehole. In other embodiments, the logging tool may be part of a logging-while-drilling or measuring-while-drilling system. Moreover, the placing may involve placing a logging tool with particular physical characteristics. For example, the logging tool may have a pressure vessel with an iron content of 17% or less by weight. Moreover, the pressure vessel may have one or all of a manganese content of 0.4% or less by weight, an aluminum content of 0.8% or less by weight, and a titanium content of 1.2% or less by weight. In yet still other embodiments, placing may involve placing a tool with a coating having enriched boron, in some cases having 0.1 $g/cm^2$ or more of boron 10, and in some cases having a thickness of 0.100 inches or less.

Regardless of the precise nature of the logging tool placed, the next step is releasing energetic neutrons from the logging tool (block 1008). Responsive to the releasing, the method proceeds to receiving (at a detector within the logging tool) gamma returns indicative of interactions of the neutrons with elements of the logging tool and elements of the formation, and the gammas indicative of neutron interactions with elements of the logging tool are substantially free from gammas indicative of interactions with iron atoms (block 1012). Thereafter, the method ends (block 1016). The receiving may further be substantially free of gammas indicative of neutron interaction with elements of the logging tool such as manganese, aluminum and titanium atoms.

The above discussion is meant to be illustrative of the principles and various embodiments of the present invention. Numerous variations and modifications will become apparent to those skilled in the art once the above disclosure is fully appreciated. It is intended that the following claims be interpreted to embrace all such variations and modifications.

What is claimed is:

1. A method comprising:
   placing a logging tool having a pressure vessel with an iron content of 17% or less by weight, the placing within a borehole proximate to an earth formation;
   releasing energetic neutrons from the logging tool; and
   receiving, at a detector within the logging tool, gamma returns indicative of interactions of the neutrons with elements of the logging tool and elements of the formation, and the gammas indicative of neutron interactions with elements of the logging tool are substantially free from gammas indicative of interactions with iron atoms.

2. The method of claim 1 wherein receiving gamma returns indicative of interactions with elements of the logging tool further comprises receiving gamma returns substantially free from gammas indicative of neutron interactions with iron in the pressure vessel of the logging tool.

3. The method of claim 1 wherein placing further comprises placing the logging tool having the pressure vessel with an iron content 17% or less by weight, a manganese content of 0.4% or less by weight, an aluminum content of 0.8% or less by weight, and a titanium content of 1.2% or less by weight.

4. The method of claim 1 wherein placing further comprises placing a logging tool having enriched boron adhered to an outer surface of the pressure vessel.

5. The method of claim 1 wherein placing further comprises placing the logging tool having 0.1 grams per square centimeter or more of boron 10 adhered to an outer surface of the pressure vessel.

6. The method of claim 1 wherein placing further comprises placing the logging tool having a coating comprising enriched boron and the coating has a thickness less than 0.100 inches.

7. The method of claim 1 wherein receiving gamma returns indicative of interactions with elements of the logging tool further comprises receiving gamma returns substantially free from gammas indicative of neutron interactions with manganese atoms.

8. The method of claim 1 wherein receiving gamma returns indicative of interactions with elements of the logging tool further comprises receiving gamma returns substantially free from gammas indicative of neutron interactions with aluminum atoms.

9. The method of claim 1 wherein receiving gamma returns indicative of interactions with elements of the logging tool further comprises receiving gamma returns substantially free from gammas indicative of neutron interactions with titanium atoms.

10. A nuclear logging tool comprising:
    a pressure housing comprising 17% or less by weight of iron;
    a coating adhered to at least a portion of the pressure housing, the coating comprising enriched boron carbide;
    a neutron source within the pressure housing, the neutron source releases energetic neutrons; and
    a gamma detector within the pressure housing, the gamma detector detects gammas indicative of interaction of neutrons with elements of the formation.

11. The nuclear logging tool of claim 10 wherein the pressure housing further comprises 0.4% or less by weight of manganese.

12. The system of claim 10 wherein the pressure housing further comprises 0.8% or less by weight of aluminum.

13. The system of claim 10 wherein the pressure housing further comprises 1.2% or less by weight of titanium.

14. The system of claim 10 wherein the pressure housing further comprises a manganese content of 0.4% or less by weight, an aluminum content of 0.8% or less by weight, and a titanium content of 1.2% or less by weight.

15. The system of claim 10 wherein the pressure housing further comprises approximately 20% by weight chromium, approximately 35% by weight nickel, approximately 10% by weight molybdenum, and approximately 35% by weight cobalt.

16. The system of claim 10 wherein the coating comprises from about 0.1 grams per square centimeter of boron 10.

17. The system of claim 10 wherein the coating has a thickness less than 0.100 inches.

18. The system of claim 17 wherein the coating has a thickness of approximately 0.0063 inches.

19. A method comprising:
    placing a logging tool having a pressure vessel with an iron content of 17% or less by weight, the placing within a borehole proximate to an earth formation;
    releasing energetic neutrons from the logging tool; and
    receiving, at a detector within the logging tool, gamma returns indicative of interactions of the neutrons with elements of the logging tool and elements of the formation, and the gammas indicative of interactions with elements of the logging tool are substantially free from gammas indicative of interactions with at least one selected from the group consisting of: iron atoms; manganese atoms; aluminum atoms; and titanium atoms.

20. The method of claim 19 wherein placing further comprises placing the logging tool having the pressure vessel with a manganese content of 0.4% or less by weight.

21. The method of claim 19 wherein placing further comprises placing the logging tool having the pressure vessel with an aluminum content of 0.8% or less by weight.

22. The method of claim 19 wherein placing further comprises placing the logging tool having the pressure vessel with a titanium content of 1.2% or less by weight.

23. The method of claim 19 wherein placing further comprises placing the logging tool having the pressure vessel with an iron content less 17% or less by weight, a manganese content of 0.4% or less by weight, an aluminum content of 0.8% or less by weight, and a titanium content of 1.2% or less by weight.

24. The method of claim 19 wherein placing further comprises placing a logging tool having enriched boron adhered to an outer surface of the pressure vessel.

25. The method of claim 19 wherein placing further comprises placing the logging tool having 0.1 grams per square centimeter of boron 10 adhered to an outer surface of the pressure vessel.

* * * * *